Patented Oct. 4, 1932

1,880,469

UNITED STATES PATENT OFFICE

BEVERLY OBER AND EDWARD H. WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

AMMONIATION OF PHOSPHATE FERTILIZER

No Drawing.    Application filed August 8, 1928.    Serial No. 298,392.

This invention relates to the preparation of fertilizers and more particularly to phosphatic fertilizer, and is a continuation in part of our prior application Serial No. 185,066 filed April 19, 1927.

To prepare super and double super phosphates it is customary to treat ground phosphate rock with sulphuric or phosphoric acid. The first step comprises the mixing of the material. This is carried out in a suitable mixing pan and for a short period of time. Due to the rapid reaction between the rock and acid the mass quickly takes on a semi-solid form. Hence it is that the mixing period is very brief because of the fact that the movement of the mixing paddles are impeded by the semi-solid mass.

After such brief mixing step the mass is discharged from the pan into a den where the reactions continue and form the agriculturally available phosphate salts. In the den the mass sets up as a porous damp product. Although the den product does contain an appreciable percentage of available phosphate, it is not in proper physical condition for grinding and bagging because it contains excess water and free acid.

In order to eliminate the excess acid it is the usual practice to dust with absorbents, such as ground phosphate rock or lime. The excess water is generally removed by allowing the mass to stand in curing sheds to permit the evaporation of the uncombined water. Such methods are uneconomical since they involve expensive rehandling of the mass and prolonged storage.

It is an object of the present invention to provide a process for manufacturing phosphate fertilizer by which the excess acid may be eliminated without rehandling the material.

Another object is to provide a process for manufacturing phosphatic fertilizer in which the steps of mixing, digesting and eliminating excess acid and water are carried out in a single container.

Another object is to quickly and effectively dry phosphatic fertilizers and at the same time introduce thereto other fertilizer values.

A further object is to devise a continuous process whereby unavailable phosphate may be converted to an available form without deleterious acidity.

An additional object is to provide a novel method of removing excess water from a batch of freshly prepared phosphate fertilizer.

Yet another object is to provide a process for treating phosphatic fertilizer with ammoniacal liquor in such a manner as to reduce the initial acidity and water content.

With these and other equally important objects in view the invention comprehends the conversion of unavailable phosphatic material to the available form under controlled conditions of temperature and pressure, and the utilization of a reagent to neutralize the excess acid and eliminate free water.

In carrying out the process measured quantities of finely divided phosphate rock, or equivalent material, and an acid are admitted to a rotary autoclave. In this container the pressure and temperature conditions may be so controlled as to maintain the mass in a mixable state for a determinative period of time, as described in our copending application Serial No. 179,706, filed March 30, 1927.

As described in our prior application, the rock and acid may be separately or simultaneously introduced to the autoclave under gravity or applied pressure. After admission of the material the autoclave may be sealed to prevent access of air and to retain the generated gaseous and vaporous reaction products. By sealing the container and imposing pressures we are enabled to maintain concentration of the original elements of the mass, and by retarding its reactivity to prevent the formation of solid end products. In this manner the material may be kept in a mixable condition for a determinative period of time and an intimate mixture of the acid and rock dust obtained.

After the materials have been thus thoroughly admixed the conditions within the container may be adjusted to permit and accelerate the reactions which result in the desired end products. To do this the temperature of the mass within the autoclave may be raised by admitting a heating medium to the thermal jacket. This increase in temperature overcomes the retarding effect of pressure and permits conversion of the insoluble phosphate to the available form.

After conversion of the material the pressure in the container may be relieved by manipulating suitably positioned valves. Upon this pressure release there is an exit of gases and a corresponding simultaneous drop in temperature which aids in crystallization of the mass.

Subsequent to this crystallization step the mass may be dried. In our earlier application referred to this was accomplished by utilizing applied heat and reducing the pressure. In the present method we contemplate at this point not only the removal of excess water but also the reduction of the free acid content of the mass to any desired extent. This may be done by admitting to the autoclave a predetermined quantity of aqueous ammonia which will take up or neutralize the free sulphuric acid. It should particularly be observed that no such quantity of the liquor should be added as will cause reversion of the formed available phosphates to the insoluble form.

The neutralizing agent may readily be injected into the mass by means of a suitably positioned pipe. This pipe may be nested in the hollow shaft of the autoclave and extended the length of the autoclave near the top. This upper section of the pipe may be provided with perforations so as to cause the liquid to flow or spray downwardly over the entire mass. To increase the spraying action a pump may be interposed in the ammonia line; or as explained in our prior application the vacuum pump may be utilized to suck in the neutralizing agent.

During this period the autoclave may be rotated so as to facilitate the contact of the liquid with the autoclave product.

After the predetermined treatment with the neutralizing agent the inlet line to the vacuum pump may be opened and any residual ammonia withdrawn through this line. This waste ammonia may be passed to an absorbing tank or tower and reused in the system as explained in application Serial No. 185,066.

It will be appreciated that the evacuation by the vacuum not only withdraws the excess of ammoniacal liquor but also removes a considerable quantity of the uncombined water. The reaction of aqueous ammonia with the free sulphuric acid or phosphoric acid is exothermic and hence increases the temperature of the material within the autoclave. It will be appreciated that upon reduction of the pressure within the autoclave much of the water will be removed as water vapor even though the temperature may be well below 100° C. It will also be appreciated that this removal of water can be accelerated by supplying heat from an extraneous source. This may be done with facility in the described apparatus by coursing a heating medium through the thermal jacket. It will be observed therefore, that by reason of the effective thermal and pressure control which may be exercised and the rapid evacuation of the gaseous products within the container, the reactions in which the aqueous ammonia are involved may be selectively governed.

By regulating the pressure and the extent and degree of heating the reactions may be controlled to secure any desired degree of neutralization of acid and removal of water.

After the treatment with the aqueous ammonia the autoclave is then opened and the product removed. Since this product is completely processed it may be ground and bagged without any additional treatment. It is to be noted that the product not only contains available phosphate but it likewise incorporates a desirable adjuvant, namely available nitrogenous material.

While we have indicated a desirable point in the process at which to introduce the neutralizing medium, it will be appreciated that this treatment could be effected at other stages of the process. Thus, if desired, the products of conversion might first be subjected to heat and reduced pressure to remove any desired quantity of water. After this drying step the aqueous ammonia may be then admitted in the calculated quantity and allowed to remain in the autoclave for the proper time to produce the desired neutralization, after which it is removed by operation of the vacuum pump. It will be understood that under the influence of heat and reduced pressure the aqueous ammonia may readily be dissociated so that the ammonia gas content of the residual liquor may be easily removed.

Inasmuch as the exothermic heat of reaction of the ammonia liquor with the acid may be utilized to assist in removal of water, we prefer to inject it after the conversion step.

The aqueous ammonia employed may be made up by the known methods, that is to say either by dissolving liquid or gaseous ammonia in water. It will be understood that the strength of the solution may vary over a wide range. It will also be understood, of course, that the quantity of extraneous heat supplied and the extent of the evacuation for the drying step will vary with the strength of the ammoniacal liquor. With a strong solution, say of twenty-five percent ammonia, the quantity of autogenous or exothermic heat will be greater and hence less extraneous heat need be applied than is the case where a ten percent ammoniacal solution is employed.

While we have described the drying treatment in connection with a preferred method of conversion, it is not limited in application to this particular method. Thus we may take the ordinary den product and by placing it in an autoclave subject it to the same neutralizing and drying stages. It is obvious however that this novel treatment is peculiarly well adapted to the autoclave conversion treatment since all the steps necessary to produce a saleable product may be carried out in a single apparatus in a minimum of time.

While we have described a particular process and apparatus by which the fundamental principles of our invention may be effectuated, it is to be understood that this is merely for the purpose of more clearly explaining these principles, and hence we do not intend to be limited to the particular succession of steps except as clearly limited thereto by the appended claims.

We claim:

1. A process of manufacturing phosphate fertilizers comprising mixing ground phosphate rock and sulphuric acid, digesting the mixture, while mechanically agitating it in a confined space under autogenous superatmospheric pressure and applied superatmospheric temperature for a period of time sufficient to effect a substantial conversion of the unavailable phosphates to available phosphates, relieving the pressure in said confined space, applying a reduced pressure to the material in said space to facilitate drying of the product and to render the same more receptive for ammonia and subsequently introducing aqueous ammonia into the said space while maintained under a reduced pressure.

2. A process of manufacturing phosphate fertilizers comprising mixing ground phosphate rock and sulphuric acid, digesting the mixture while mechanically agitating it in a confined space under autogenous superatmospheric pressure and applied superatmospheric temperature for a period of time sufficient to effect a substantial conversion of the unavailable phosphates to available phosphates, relieving the pressure in said confined space to effect crystallization and drying of the reaction product, further reducing the pressure to complete the crystallization and drying and to produce a partial vacuum in the pores of the reaction product and admitting aqueous ammonia to the confined space while maintained under a reduced pressure.

3. A process of manufacturing superphosphate comprising mixing predetermined quantities of finely ground phosphate rock and strong sulphuric acid, then passing the unset mixture to a confined space, digesting the mass, while mechanically agitating, under autogenous superatmospheric pressures and maintaining the mass at elevated temperatures during the digestion by applying extraneous heat, continuing the digestion for a period of time sufficient to effect a substantial conversion of the unavailable phosphate to available forms, relieving the pressure in said confined space, applying a reduced pressure to the material in said space, to facilitate drying of the product and to render the same more receptive for ammonia and subsequently introducing aqueous ammonia into the said space while maintained under a reduced pressure.

4. A process of manufacturing superphosphate comprising mixing predetermined quantities of finely ground phosphate rock and strong sulphuric acid, then passing the unset mixture to a confined space, digesting the mass while mechanically agitating, under autogenous superatmospheric pressures and maintaining the mass at elevated temperatures during the digestion by applying extraneous heat, continuing the digestion for a period of time sufficient to effect a substantial conversion of the unavailable phosphate to available forms, relieving the pressure in said confined space to effect crystallization and drying of the reaction product, further reducing the pressure to complete the crystallization and drying and to produce a partial vacuum in the pores of the reaction product and admitting aqueous ammonia to the confined space while maintained under a reduced pressure.

5. A process of manufacturing phosphate fertilizers comprising mixing ground phosphate rock and sulphuric acid, digesting the mixture, while mechanically agitating it in a confined space under autogenous superatmospheric pressure and applied superatmospheric temperature for a period of time sufficient to effect a substantial conversion of the unavailable phosphates to available phosphates, relieving the pressure in said confined space, applying a reduced pressure to the material in said space to facilitate drying of the product to render the same more receptive for ammonia and subsequently introducing aqueous ammonia into the said space while maintained under a reduced pressure and while agitating the mass in said confined space.

6. A process of manufacturing phosphate fertilizers comprising mixing ground phosphate rock and sulphuric acid, digesting the mixture while mechanically agitating it in a confined space under autogenous superatmospheric pressure and applied superatmospheric temperature for a period of time sufficient to effect a substantial conversion of the unavailable phosphates to available phosphates, relieving the pressure in said confined space to effect crystallization and drying of the reaction product, further reducing the pressure to complete the crystallization and drying and to produce a partial vacuum in the pores of the reaction product and admitting aqueous ammonia to the confined space while maintained under a reduced pressure and while agitating the mass in said confined space.

7. A process of manufacturing phosphate fertilizers comprising mixing ground phosphate rock and sulphuric acid, digesting the mixture, while mechanically agitating it in a confined space under autogenous superatmospheric pressure and applied superatmospheric temperature for a period of time sufficient to effect a substantial conversion of the unavailable phosphates to available phosphates, relieving the pressure in said confined space to effect crystallization and drying of the reaction product, further reducing the pressure to complete the crystallization and drying and to produce a partial vacuum in the pores of the reaction product and admitting aqueous ammonia to the confined space while maintained under a reduced pressure and subsequently withdrawing excess ammonia from said confined space.

8. A method of treating acid phosphate fertilizer to incorporate nitrogen values therein comprising subjecting a mass of the acid phosphate fertilizer to a reduced pressure in a confined space to render the material more receptive to the action of ammonia, and introducing aqueous ammonia into said confined space while under reduced pressure.

9. A method of treating acid phosphate fertilizer to incorporate nitrogen values therein comprising subjecting a mass of the acid phosphate fertilizer to a reduced pressure in a confined space to render the material more receptive to the action of ammonia and introducing aqueous ammonia into said confined space while under reduced pressure, and agitating the mass while under reduced pressure and while being subjected to the action of ammonia.

10. A method of treating acid phosphate fertilizer to incorporate nitrogen values therein comprising subjecting a mass of the acid phosphate fertilizer to a reduced pressure in a confined space to render the material more receptive to the action of ammonia, and introducing aqueous ammonia into said confined space while under reduced pressure and subsequently withdrawing excess ammonia from the confined space.

In testimony whereof we affix our signatures.

BEVERLY OBER.
EDWARD H. WIGHT.